March 13, 1934. T. E. MULROYAN 1,950,947
PIPE FITTING MEMBER
Filed Dec. 17, 1931

Inventor:
THOMAS E. MULROYAN,
by Usina & Rauber
his Attorneys.

Patented Mar. 13, 1934

1,950,947

UNITED STATES PATENT OFFICE 1,950,947

PIPE FITTING MEMBER

Thomas E. Mulroyan, De Kalb, Ill., assignor to The American Steel and Wire Company of New Jersey, a corporation of New Jersey Application December 17, 1931, Serial No. 581,703

4 Claims. (Cl. 285—203)

My invention relates to pipe fitting members and to a method of attaching pipes thereto, one of my objects being to provide a pipe with an appropriate fitting in such a manner that the two form a unit. Other objects will be made apparent by the following disclosure.

In general, my invention consists in providing a fitting member with a portion that is shaped to receive a pipe's end and to radially deform the same upon the application of axially directed force. This portion is preferably constructed with an entrance which substantially conforms in shape to that of the exterior of the pipe for which the member is intended and with an inside surface that is gradually radially elongated. When the pipe's end is forced into this socket it will assume the latter's shape, the pipe end then having what might be termed a "fish tail" shape which prevents its removal.

Figure 1:
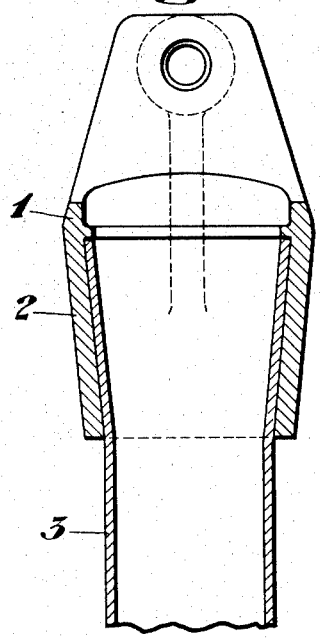
Figure 2:
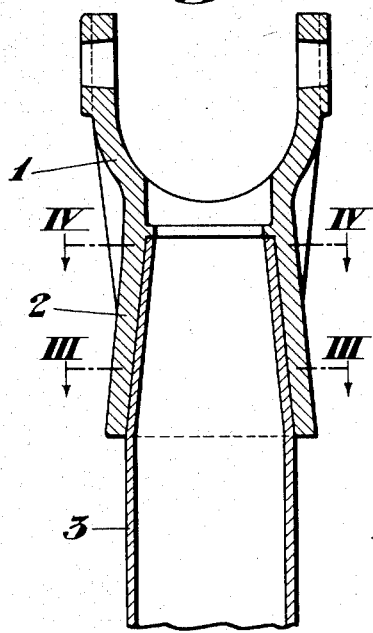
Figure 4:
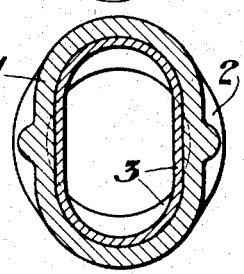
Figure 3:
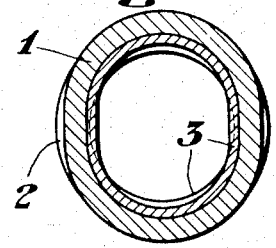
Figure 5:
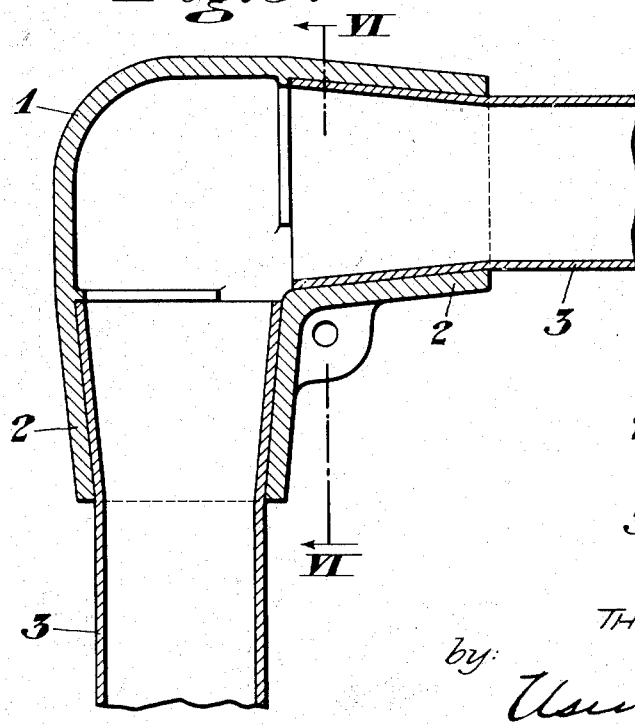
Figure 6:
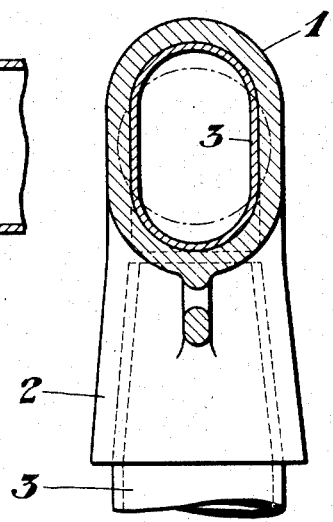

The accompanying drawing shows two examples of my invention, one form being illustrated by Figures 1 and 2 which are longitudinal cross-sections taken at right angles to each other, and Figures 3 and 4 which are lateral cross-sections taken from the lines III—III and IV—IV in the second figure, the other form being illustrated by Figures 5 and 6 which are a longitudinal cross-section and a lateral cross-section taken from the line VI—VI of Figure 5.

Having reference to all of the above figures, a pipe fitting 1, of the character used in making fences, is made with a portion 2 in which a pipe's end 3 has been placed. This portion is constructed, in each instance, to have an entrance conforming to the exterior of the pipe 3 and an inside surface that gradually assumes an elongated shape. Consequently, when the end was thrust into place in this portion 2 it was deformed so as to be tightly wedged in position. Figures 1 and 5 show particularly well how the pipe's end is shaped when in place.

The first form of the invention shown is shaped by casting, while the second form shows an elbow whose middle section has been crushed or flattened slightly by pressure to secure the desired internal radial elongation of the pipe end receiving portions.

These portions are preferably made so that their inside perimeter is the same throughout, whereby stretching of the pipe's wall is eliminated as much as possible.

Although I have shown a specific form of my invention in accordance with the patent statutes, I do not intend to limit my invention exactly thereto, except as defined by the appended claims.

I claim:

1. A pipe fitting member including a portion adapted to receive the end of a pipe, said portion having an entrance conforming to the exterior of said pipe and an inside surface that gradually assumes an elongated shape.

2. A pipe fitting member including a portion adapted to receive the end of a pipe, said portion having an entrance conforming to the exterior of said pipe and an inside surface that gradually assumes an elongated shape, said inside surface having the same perimeter throughout.

3. A pipe fitting member including a portion adapted to receive the end of a pipe, said portion having an entrance conforming to the exterior of said pipe and a continuous inside surface that gradually assumes an elongated shape.

4. A pipe fitting member including a portion adapted to receive the end of a pipe, said portion having an entrance conforming to the exterior of said pipe and a continuous inside surface that gradually assumes an elongated shape, said inside surface having the same perimeter throughout.

THOMAS E. MULROYAN.